Sept. 19, 1967 J. H. LUX ET AL 3,342,365
WELDED CONTAINERS
Filed Sept. 23, 1966 3 Sheets-Sheet 1
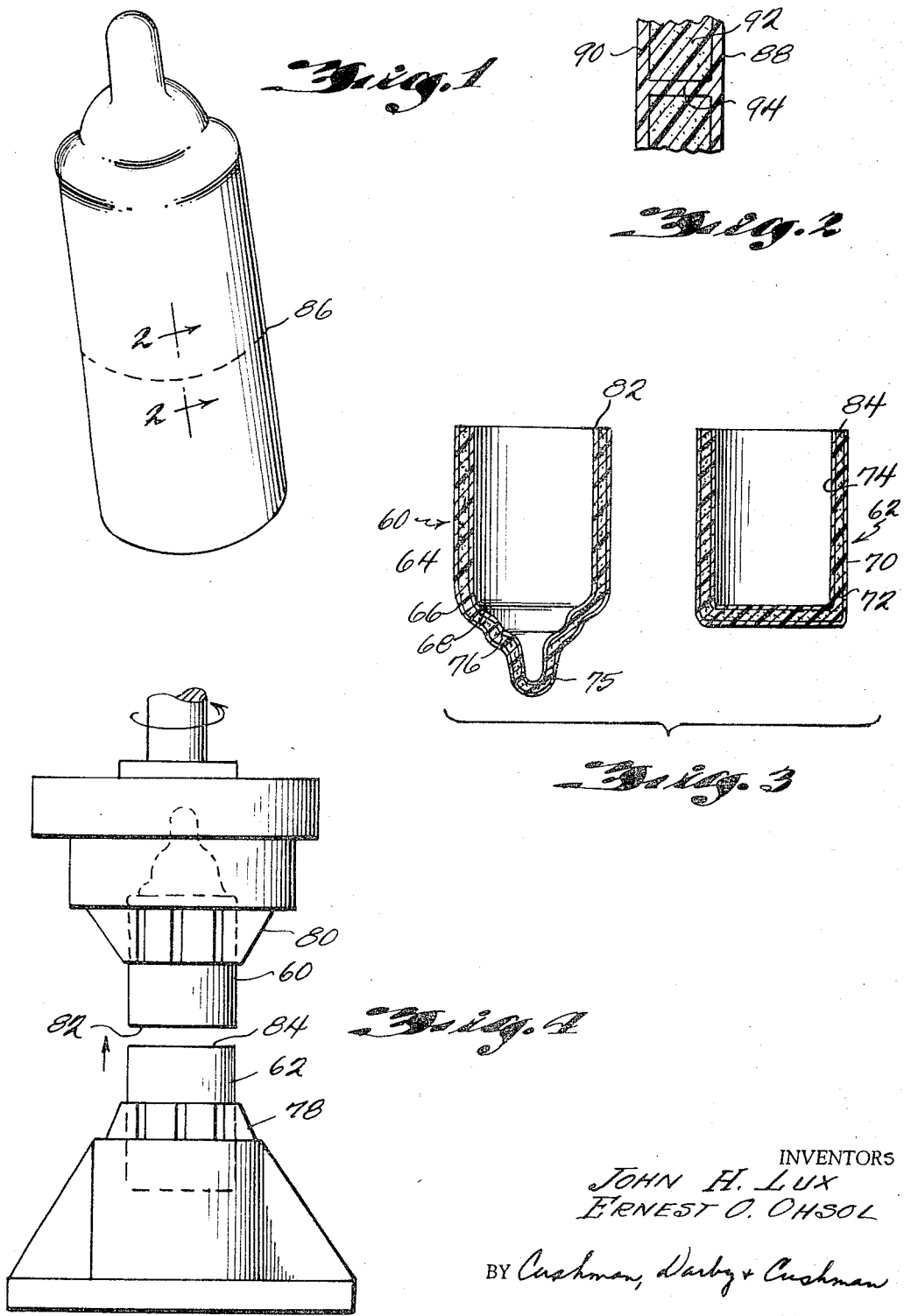
INVENTORS
JOHN H. LUX
ERNEST O. OHSOL
BY Cushman, Darby & Cushman
ATTORNEYS

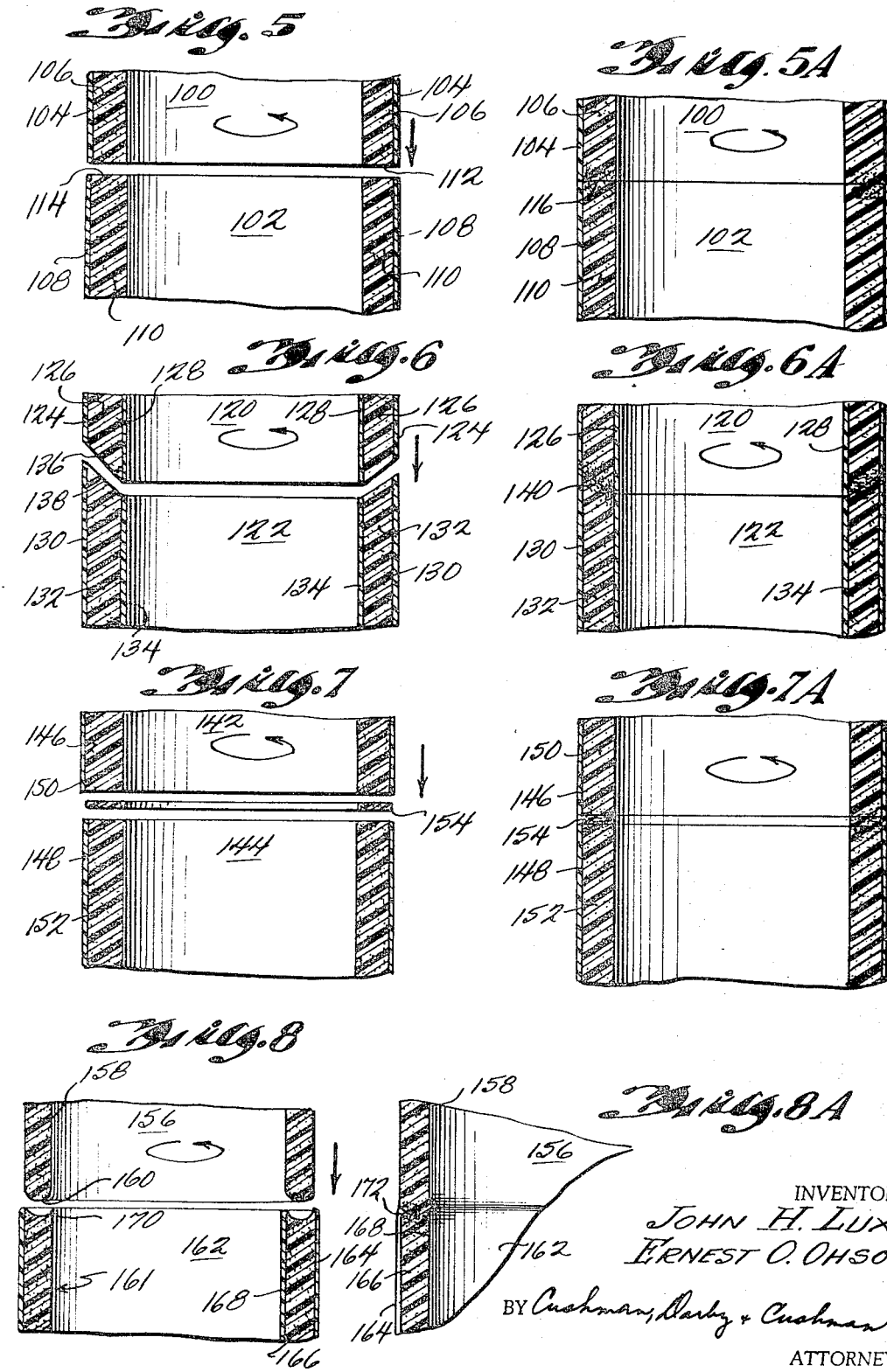

Sept. 19, 1967     J. H. LUX ET AL     3,342,365

WELDED CONTAINERS

Filed Sept. 23, 1966     3 Sheets-Sheet 3

INVENTORS
JOHN H. LUX
ERNEST O. OHSOL
BY Cushman, Darby & Cushman
ATTORNEYS

United States Patent Office 3,342,365
Patented Sept. 19, 1967

3,342,365
WELDED CONTAINERS
John H. Lux and Ernest O. Ohsol, New York, N.Y., assignors to Haveg Industries, Inc., Wilmington, Del., a corporation of Delaware
Filed Sept. 23, 1966, Ser. No. 581,575
13 Claims. (Cl. 220—4)

This application is a continuation-in-part of application Ser. No. 318,386, filed Oct. 23, 1963, now Patent 3,290,-198, issued Dec. 6, 1966, and application Ser. No. 373,-497, filed June 8, 1964, now Patent 3,275,179, issued Sept. 27, 1966.

This invention relates to the preparation of milk bottles and other containers.

In the past, foamed plastics have not been used in food applications because of the bacterial contamination problems. The use of low cost plastic containers for milk has not yet achieved fruition on any substantial scale because of rigidity requirements.

It has also been difficult and expensive to form certain container shapes by blow molding, injection molding or similar processes because of their completely closed shapes or reentrant curvatures.

It is an object of the present invention to prepare foam plastic containers for milk and other food products.

Another object is to prepare such containers free of contamination.

A further object is to prepare containers for milk and other products which will withstand sterilization temperatures.

Yet another object is to prepare lightweight containers for milk and other products.

An additional object is to prepare spin welded foamed plastic containers having good strength in the area of joinder.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

According to one aspect of this invention, it has been found that milk containers can be prepared from foamed thermoplastic materials having at least one unfoamed, nonporous, integral skin.

The use of low cost plastic containers for milk has not yet achieved fruition on any substantial scale because of rigidity and cleanliness requirements. Foamed plastics have not proven suitable in food applications because of the bacterial contamination problems. By having at least one integral, faultless, nonporous, unfoamed skin on the foamed container freedom from contamination is assured. Additionally, the combination of the integral skin and foam combination insures the combination of rigidity, light weight and low cost. There can be unfoamed, nonporous, integral skins on both sides of the foamed core for maximum protection—or only a single skin can be employed. If only a single skin is used, preferably, it is on the interior of the container to prevent the milk from penetrating into the foam structure. The containers of the present invention are resistant to breakage and shattering, are easily filled and can be readily sealed.

When employing polystyrene and materials of similar density, it is desirable that the foam have a density between 5 and 45 lbs./cu. ft., preferably between 12 and 35 lbs./cu. ft. The skin or skins are essentially unexpanded and have a considerably higher density than the foamed portion or core, e.g., the skins can have a density of 60 to 66 lbs./cu. ft. The foamed polymer can have a density between 7.5% and 85% of the unfoamed plastic, preferably between 15 and 60% that of the unfoamed plastic.

When employing polystyrene, there can be employed normal crystal grade polystyrene or high impact polystyrene or a mixture containing 5 to 95% normal crystal grade polystyrene and the balance high impact polystyrene. When employing a thermoplastic styrene polymer, it normally contains greater than 50% by weight of styrene and preferably at least 70% by weight of styrene in its structure. High impact polystyrenes are frequently prepared by polymerizing monomeric styrene in the presence of 2 to 15% by weight of a rubbery diene polymer or by polymerizing styrene in the presence of such amounts of a difunctional material. Examples of high impact styrene include a terpolymer of 5% acrylonitrile, 5% butadiene and 90% styrene; a copolymer of 5% butadiene and 95% styrene; the product made by polymerizing 95% of styrene in the presence of 5% of polybutadiene; a copolymer of 5% chlorosulfonated polyethylene and 95% styrene; a blend of 97.5% polystyrene and 2.5% polybutadiene; a blend of 95% polystyrene and 5% hydrogenated polybutadiene containing 35.4% residual unsaturation; polystyrene formed in the presence of 5% hydrogenated polybutadiene containing 4.5% of residual unsaturation, a blend of 95% polystyrene and 5% polyisoprene, a blend of 98% polystyrene with 2% rubbery butadiene-styrene copolymer, a blend of 85% polystyrene with 15% of rubbery butadiene styrene copolymer, and a copolymer of 99.5% styrene and 0.5% divinyl benzene.

Unless otherwise indicated, all parts and percentages are by weight.

The foamed thermoplastic resins which can be employed to form the spin welded containers according to the present invention include chlorinated rubber, cellulose ethers and esters, e.g., ethyl cellulose, cellulose acetate, cellulose acetatebutyrate, bituminous materials, paraffin wax, homopolymers of propylene, isobutylene, butene-1, vinyl halides, e.g., vinyl chloride and vinyl fluoride; vinylidene chloride; vinyl esters of carboxylic acids, e.g., vinyl acetate, vinyl stearate, vinyl benzoate, vinyl ethers, e.g., vinyl methyl ether, vinyl ethyl ether, vinyl isobutyl ether; chlorotrifluoroethylene, tetrafluoroethylene, hexafluoropropylene, unsaturated carboxylic acids and derivatives thereof, e.g., acrylic acid, methacrylic acid, methyl acrylate, methyl alpha chloracrylate, ethyl acrylate, methyl methacrylate, acrylamide, acrylonitrile, methacrylonitrile, and interpolymers of the above-mentioned vinylidene monomers with alpha, beta-unsaturated polycarboxylic acids and derivatives thereof, e.g., maleic anhydrides, diethyl maleate, dibutyl fumarate, diallyl maleate, dipropyl maleate, etc. A preferred class of materials with which optimum results are obtained are rigid, relatively nonelastic, thermoplastic resins, such as homopolymers and interpolymers of vinyl chloride, e.g., polyvinyl chloride, vinyl chloride-vinyl acetate copolymer (87:13), vinyl chloride-acrylonitrile copolymer (80:20); homopolymers of vinylidene aromatic hydrocarbons and ring halogenated derivatives thereof, e.g., styrene, o-chlorostyrene, p-chlorostyrene, 2,5 - dichlorostyrene, 2,4 - dichlorostyrene, p-methylstyrene, p-ethylstyrene, alpha - methylstyrene, vinyl naphthalene and interpolymers of such vinylidene monomers with each other and with other vinylidene monomers in which the interpolymer contains at least 70% of the vinylidene aromatic hydrocarbon compound, e.g., a copolymer of 70% styrene and 30% acrylonitrile. One of the preferred class of resins is thermoplastic styrene polymers containing at least 70% by weight of styrene in the structure.

Other suitable thermoplastic resins include polycarbonates, e.g., the polymer from bisphenol-A and diphenyl carbonate; polyoxymethylene (Delrin), oxymethylene-alkylene oxide copolymers, e.g., oxymethylene-ethylene oxide (95:5) polyurethanes, e.g., prepolymers from toluene diisocyanate and polypropylene glycol molecular weight 2025; Dacron (polyethylene terephthalate), nylon (e.g., polymeric hexamethylene adipamide). ABS terpolymers can be used, e.g., the terpolymer of 25% butadiene, 15% acrylonitrile and 60% styrene (a rigid ABS terpolymer), as well as other terpolymers containing 25 to 60% butadiene, 10 to 20% acrylonitrile and 20 to 60% styrene.

The invention is of particular value with foams from polyethylene (of high density, e.g., 0.960, medium density, e.g., 0.935 or low density, e.g., 0.914), polypropylene, copolymers of ethylene and propylene (e.g., 50:50 copolymer, 60:40 copolymer and 20:80 copolymer) regular or high impact polystyrene, acrylonitrile-butadiene-styrene terpolymer, polyvinyl chloride (preferably rigid polyvinyl chloride), copolymers of ethylene with minor amounts of butene-1 (e.g., 90:10 and 97.5:2.5); terpolymers of ethylene, propylene and up to 5% of a nonconjugated polyolefin such as pentadiene-1,4 and dicyclopentadiene, e.g., a terpolymer of 60% ethylene, 39% propylene and 1% alloocimene or pentadiene-1,4.

There can also be prepared spin welded foamed containers from fluorocarbon polymers such as polytetrafluoroethylene, polyhexafluoropropylene, and tetrafluoroethylene-hexafluoropropylene copolymer (e.g., 50:50).

The container halves can be formed intially by vacuum forming or other thermoforming procedure or they can be formed by injection molding.

Both halves of the container subjected to spin welding juncture can be made of skinned foamed plastic. Alternatively one of the two portions of the container can be unfoamed. The use of a skinned foam has the advantage over foams without such a skin of greater resistance to permeation, contaimination and flavor effects, as well as increased mechanical strength. Also, it has been found that in the spin welding operation it is essential to have high bulk density at the point of juncture. The densification in the skin area satisfies this requirement.

It also has been found that when there is no skin on at least one member in the weld area, spin welded containers cannot be prepared from foams. The reason for this appears to be that the two nonskinned foam surfaces tend to break away in little particles which then are rolled into little balls. The balls are the warm part of the foam and as a result a start must be made again on the cold part of the foam in an attempt to obtain the jointure. The net result is that no satisfactory weld is produced and there is no fusion of surfaces.

To insure formation of a uniform, small cell, foamed portion a nucleating agent is desirably incorporated prior to foaming. The nucleating agent can be the sole foaming agent, although usually additional foaming agents are employed as set forth below.

When a nucleating agent is employed, it is used in an amount of from 0.02 to 10% of the total polystyrene by weight. Preferably, 0.4 to 2% of the nucleating agent is used.

Conventionally, the nucleating agents are made up of two materials which react to form carbon dioxide and water. The two materials are normally used in approximately equivalent amounts. As the carbon dioxide liberating materials there can be used ammonium, alkali and alkaline earth carbonates or bicarbonates, e.g., ammonium bicarbonate, sodium bicarbonate, sodium carbonate, potassium bicarbonate, calcium carbonate. The other material is an acid or acid-reacting salt, preferably solid, which is sufficiently strong to liberate the carbon dioxide from the carbonate or bicarbonate. Generally, the acid has at least 3.0 milliequivalents of acidic hydrogen, and preferably at least 10.0 milliequivalents, per gram. The acid can be organic or inorganic. Suitable acidic materials include boric acid, sodium hydrogen phosphate, fumaric acid, malonic acid, oxalic acid, citric acid, tartaric acid, potassium acid tartrate, chloracetic acid, maleic acid, succinic acid and phthalic acid. In place of the anhydrous acids or salts there can be used the solid hydrates, e.g., oxalic acid dihydrate and citric acid monohydrate.

While not essential, there can also be added a wetting agent such as Bayol 35 (a petroleum aliphatic hydrocarbon white oil), kerosene having an average of at least 8 carbons in the molecule, alkylphenolalkylene oxide adducts, e.g., Triton X–100 (t-octylphenolethylene oxide adduct having 10 ethylene oxide units in the molecule), sodium lauryl sulfate and sodium dodecylbenzene sulfonate. The wetting agent can be nonionic or anionic.

One mode of incorporating the foaming agent into the polymer is by premixing the pelletized, solid, thermoplastic polymer, e.g., high impact styrene polymer, with a minor amount of an absorbent having absorbed thereon a volatile liquid, (i.e., the foaming agent) which is nonreactive with and which has not more than a slight solvent action on the polymer. The volatile liquid should volatilize below the softening point of the polymer.

As the absorbent there can be employed any conventional absorbent in finely divided form, such as diatomaceous earth (Celite), fuller's earth, silica gel, e.g., Cab-O-Sil and Hi-Sil, activated alumina, molecular sieves, attapulgus clay and activated carbon. The absorbent is usually used in an amount of 0.1 to 15%, preferably, 0.5 to 10% by weight of the polymer, although up to 25 or 30% of absorbent can be employed. The absorbent is an inert filler of large surface area but small particle size, e.g., 200 mesh or below.

As the volatile liquid there can be used aliphatic hydrocarbons boiling between 10° and 100° C. and preferably between 30° and 90° C., e.g., petroleum ether (containing primarily pentane or hexane or a mixture of these hydrocarbons), pentane, hexane, isopentane, heptane, cyclohexane, cyclopentane, pentadiene and neopentane. Other volatile liquids include methanol, ethanol, methyl acetate, ethyl acetate, methyl chloride, butane, acetone, methyl formate, ethyl formate, dichloroethylene, perchloroethylene, dichlorotetrafluoroethane, isopropyl chloride, propionaldehyde, diisopropyl ether, dichlorodifluoromethane, a mixture of pentane with 5 to 30% of methylene chloride or other volatile lower halogenated hydrocarbon.

The amount of volatile liquid absorbed on the absorbent can vary from 5 to 150% or more based on the weight of the absorbent. The amount of liquid absorbed will depend upon the capacity of the absorbent for the particular liquid. Normally, the absorbent containing the volatile liquid will appear to be a dry powder. The volatile liquid employed should be one which is nonreactive with the particular polymer employed. Usually, the amount of volatile liquid will be 0.1 to 15% by weight of the polymer, e.g., polystyrene, to be expanded. The amount of volatile liquid will depend upon the extent of foaming desired. In general, the greater the amount of absorbed volatile liquid in the polymer-absorbent mixture the more the expansion. It has been found that good expansion can be obtained using very small amounts of the volatile liquid.

The free-flowing powder consisting of the low boiling solvent or semi-solvent adsorbed on the inert filler of large surface area is added to the extrusion grade plastic pellets, preferably along with the nucleating agent, and tumbled in a mixer. The powder containing the volatile blowing agent will then disperse uniformly throughout the mixture while adhering to the plastic pellets. The mixture is then fed into the hopper of an extruder.

Instead of absorbing the volatile liquids on a filler, there can be employed conventional expansible thermoplastic materials such as expansible polystyrene containing 1 to 9% of one of the volatile liquids, e.g., Dow- Pelespan 101 (expansible polystyrene beads containing 6% pentane).

The plastic material is formed into a foamed sheet, for example, by hot extruding the foamable thermoplastic resin in the form of a sheet. The upper and lower surfaces only of the sheet, as it emerges from the extruder, are rapidly chilled to prevent expansion thereof while permitting the still warm core of the sheet to expand. It is also possible to chill only one surface if a single skin is to be formed. The thus-prepared foamed sheet can be formed into the container sections in various ways. The foamed sheet having an upper (or upper and lower) unfoamed, nonporous, tough skin can be vacuum formed into a container half by using conventional vacuum drawing techniques, e.g., as set forth in Tiffin application Ser. No. 261,683, filed Feb. 28, 1963, now abandoned.

The upper (and lower) skins of the sheet become the inner (and outer) skins of the container halves.

In general, the foamed core comprises 50 to 96% of the total thickness of the skins and core. The skins each normally range from 3 to 25% of the total thickness. While the density of the foam can be from 5 to 75% of the density of the unfoamed polymer, preferably, it is 10 to 50% of the density of the unfoamed polymer.

The inner and outer skins are formed as stated by rapid chilling, i.e., quenching, the surfaces of the sheet or tube as it commences to foam. The chilling can be done with an air blast, an air-water mist, argon, helium, nitrogen, water or other inert fluid. If two skins are present, they can be of the same or different thickness. Skins of different thicknesses can be formed, for example, by using a lower temperature or a higher flow rate for the quenching fluid (or both) on the inner surface than on the outer surface of the material. Convenient cooling conditions are 70° F. with air or an air-water mist at 60 ft./sec. The cooling temperature can vary from 0° to 100° F. and cooling fluid flow rates of 40 to 100 ft./sec. are satisfactory.

The final foamed containers can have a total thickness of 10 to 300 mils. In general, the larger the containers the thicker should be the unfoamed skins.

The containers can be used with milk, either whole milk or skim milk or buttermilk, cream, fruit juices, e.g., orange juice, grape juice, grapefruit juice, tangerine juice, lemon juice or other beverages.

The containers can be cylindrical or bulbous. Certain container shapes are difficult or expensive to form by blow molding, injection molding and similar processes because of their completely closed shapes or reentrant curvature. By the use of the spin welding technique containers can be economically molded. Thus, two halves of a container can be thermoformed, e.g., vacuum formed, in conventional fashion and then spin welded together. Alternatively, the two halves can be injection molded. Thus, there can be prepared a container having a bottom cylindrical portion and a top frusto-conical portion ending in a nipple shape. The bottom and top portions can be vacuum formed separately from a foamed sheet having upper and lower integral, unfoamed, nonporous skins and prepared in the manner previously set forth. Thus, the bottom portion can be rotated rapidly, e.g., at 1,000 to 10,000 r.p.m. around a vertical axis. The top portion is momentarily prevented from rotating and is gradually pressed onto the spinning portion from a holding device which permits the initially nonrotating portion of the container to achieve a condititon of rapid rotation. Thus, as the stationary portion is brought into contact with the lower spinning portion, there is initially a high relative velocity between the surfaces being brought into contact (e.g., horizontal plane surfaces) and, consequently, a rapid generation of heat which brings the contiguous surfaces to the welding temperature. As this occurs, the initially stationary upper portion of the container is accelerated into rotation and eventually reaches the same angular velocity as the initially spinning lower portion.

The acceleration and fusion can be regulated to coincide timewise, if desired, by adjusting the clamping pressure, frictional drag and air or other fluid cooling at the weld line. When the sealing is accomplished the container is released and sent to further processing. Instead of rotating the lower portion of the container initially, it is possible to rotate the upper portion while initially keeping the lower portion from rotating. It is also possible to join the two halves of a foamed thermoplastic container having at least one skin by carrying out the spin welding about a horizontal axis.

The outward rims of the two halves (the rims which are to be joined together) can be matingly compressed, e.g., to one-half their original foamed thickness prior to the spin welding. These relatively dense rim surfaces are then eminently suited for the functional heating to fusion temperatures by spin welding either about a horizontal or a vertical axis.

It is essential to have the skin on the foamed container portion and, preferably, there should be both inner and outer skins. If the container were an all-foam (unskinned) material, the poor heat transfer characteristics of the foam would cause a very irregular and imperfect heat sealed joint between the halves.

The thus-formed container can be filled by puncturing the bottom of the container with a needle, filling through the needle, removing the needle and then heating the nub of material (formed when originally inserting the needle) to melt the same and to fill the hole caused by the needle.

This procedure can be used to form a wide variety of containers, e.g., for use with milk (whole or skim), cream, fruit juices, e.g., orange, grapefruit, grape, lemon and prune juices, carbonated beverages, e.g., cola drinks, club soda and ginger ale, beer, coffee, salad dressing, lubricating oil, liquid shampoos, bleaching solution, soup and even ice cream.

When appropriate temperature-resistant thermoplastics are employed, they are particularly valuable as disposable sterilizable containers. Thus, after filling with milk, fruit juice or other beverage or foodstuff they can be heated to sterilizing temperature, e.g., 220° to 260° F. for 1 minute to 1 hour or longer. The use of skinned foam-type material makes possible the minimum of material for a given degree of container rigidity and also makes possible the formation of self-insulating containers.

Suitable materials for use in preparing containers which are sterilized either before or after filling are low pressure, high density (e.g., 0.94) polyethylene, polypropylene, polyethylene irradiated to an extent of 4 to 30 megarads, e.g., 12 megarads, high pressure, low density (e.g., 0.916) polyethylene crosslinked sufficiently to raise its melting or softening point to 250° F., e.g., as shown in Rainer Patent 2,877,500, copolymers of ethylene with propylene or butene-1 having softening points of 240° F. or above, polycarbonates, e.g., the polycarbonate from diphenyl carbonate and bisphenol-A, polyoxymethylenes, e.g., of molecular weight of 15,000 or above. In addition to oxymethylene homopolymers there can be used copolymers having 50 to 99.9%, preferably, 85 to 99.9% of oxymethylene (—OCH$_2$—) units interspersed with —O—R— units wherein R is a divalent radical containing at least two carbon atoms directly linked to each other and positioned in the chain between the two valences, any substituents in the R radical being inert. The —O—R— units can be those derived by ring opening of ethylene oxide, dioxolane, propylene oxide, tetramethylene oxide, 1,4-dioxane, trimethylene oxide, pentamethylene oxide, 1,2-butylene oxide, 2,2-di(chloromethyl)1,3-propylene oxide, etc. Representative oxymethylene homo and copolymers are set forth in Dolce Patent 3,103,499, Walling Patent 3,027,352 and Kray Patent 3,026,299 and the references cited therein.

If the container, e.g., a milk bottle, formed by spin welding is intended for infant feeding, the nipple end, after filling therethrough and sterilizing, can be sealed with a tight fitting, sterile metal foil cap, or with a hot fluid wax material, or with a heat shrunk plastic film, as previously described. These cap materials can be selected so as to be easily cracked off or peeled when it is desired to use the contents of the container.

This invention permits the use of a minimum of material for a given degree of container rigidity, and also makes possible the forming of self-insulating containers.

The invention will be understood best in connection with the drawings, wherein:

FIGURE 1 is a view of the bottle made by spin welding according to the invention;

FIGURE 2 is a sectional view along the line 2—2 of FIGURE 1;

FIGURE 3 is a view showing the two halves of the container used for spin welding;

FIGURE 4 is a view showing the manner of spin welding;

FIGURES 5 and 5A are views partially broken away showing an alternative spin welding technique;

FIGURES 6 and 6A are views partially broken away showing another spin welding technique;

FIGURES 7 and 7A are views partially broken away showing still another spin welding technique;

FIGURES 8 and 8A are views partially broken away showing a still further alternative spin welding technique according to the invention;

Figure 9:
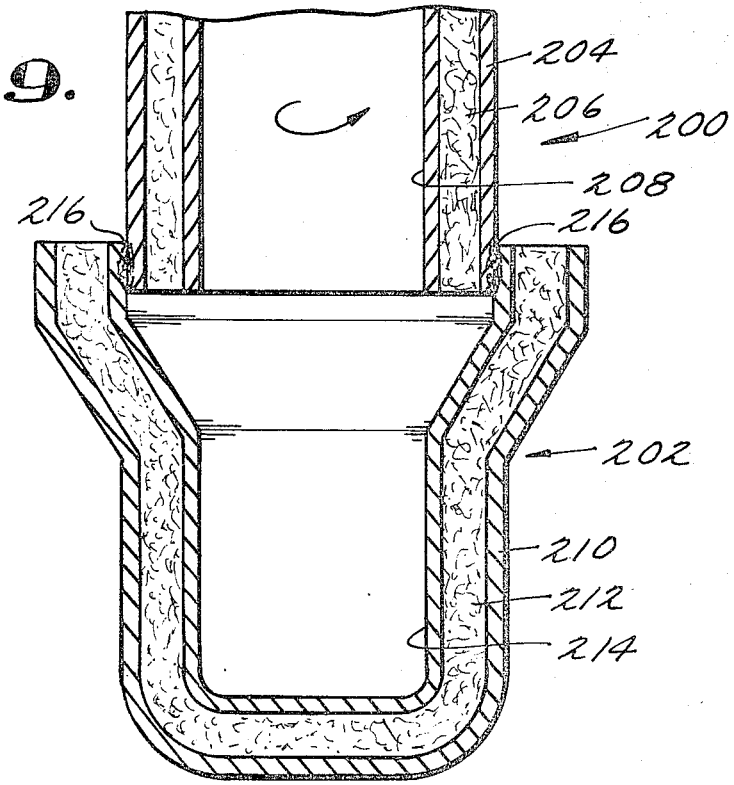
FIGURE 9 is a view partially broken away and in section showing a preferred weld according to the invention.

Referring more specifically to the drawings, polypropylene containing a small amount of pentane absorbed on Celite (diatomaceous earth), e.g., 100 parts polypropylene, 1 part pentane and 1 part Celite, was extruded to form a sheet having a nonporous, tough upper skin and a nonpourous, tough lower skin integrally united to a foam core by air chilling the upper and lower surfaces as the foaming sheet emerged from the extruder. This skinned, foamed sheet was then vacuum formed into the two halves 60 and 62 of a bottle. Bottle half 60 was composed of a nonporous, unfoamed, tough outer skin 64, a foamed core 66 and a nonporous, unfoamed, tough inner skin 68. Similarly, bottle half 62 was composed of a nonporous, unfoamed, tough outer skin 70, a foamed core 72 and a nonporous, unfoamed, tough inner skin 74. Both halves of the bottle had an over-all wall thickness of 60 mils with a 10 mil outer skin, a 10 mil inner skin and a 40 mil foam core.

The top half of the container has a generally frustoconical portion 76 ending in a nipple shape as at 75. The bottom half of the container is of cylindrical shape.

The bottom half 62 of the container is positioned in holding device 78 and the top half 60 of the container is placed in a holding device 80. Holding device 80 is rapidly rotated around its vertical axis, e.g., at 2000 r.p.m. The bottom half 62 is initially clamped and thereby prevented from rotating and is gradually pressed in the direction of the arrow onto the rapidly spinning half 60. Thus, as the stationary portion 62 is brought into contact with the spinning portion 60, there is initially a high relative velocity between the surface 82 of the upper half and the surface 84 of the lower half as they make contact. Consequently, there is a rapid generation of heat which brings the contiguous surfaces to the welding temperature. The nonrotating portion 62 is then gradually released from the clamping pressure so that it can rotate freely around the same axis as spinning half 60 and the portion 62 is thus accelerated into rotation and eventually reaches the same angular velocity (2000 r.p.m.) as the initially spinning portion 60. When the sealing or welding is accomplished, the finished container 86 is released and sent to further processing.

As can be seen from FIGURE 2, the wall of the container 86 comprises a nonfoamed, nonporous outer skin 88, a nonporous, tough inner skin 90 and a foamed core 92. In the area 94 where the spin welding occurs the porosity in the foam portion is greatly reduced and, in some cases, disappears completely due to the heat generated in the spin welding which softens or melts the polypropylene.

The spin welded bottle is filled with tomato soup through an injection needle, the needle withdrawn, the hole sealed up and the bottle and contents sterilized at 250° F. for 30 minutes.

Another suitable polypropylene formulation for forming the skinned foam product which is spin welded to form the bottle consists of 100 parts polypropylene, 1.3 parts citric acid and 1.7 parts sodium bicarbonate.

The spin welding procedure as illustrated in FIGURE 5 was carried out using polystyrene. There was employed 50 parts of pellets of high impact polystyrene (Foster Grant's Tuflex 216, polystyrene modified with 5% polybutadiene) and 50 parts of pellets of regular crystal polystyrene (Koppers Dylene 8). This composition is designated hereinafter as Composition A.

Composition A was mixed with 1.3 parts of citric acid, 1.7 parts of sodium bicarbonate and 0.2 part of Bayol 35 (a petroleum aliphatic hydrocarbon white oil). This mixture hereinafter identified as Composition B was then extruded at 170° C. to form a foamed sheet. An upper unfoamed, nonporous skin was formed on the sheet by directing a blast of air at 20° C. at a velocity of 80 ft./sec. at the upper surface of the sheet as it was extruded and prior to substantial foaming. In some instances a similar chilling blast of air at 20° C. and a velocity of 80 ft./sec. was directed at the lower surface of the sheet to form a lower unfoamed, nonporous skin.

The sheets thus formed with either an upper skin or both upper and lower skins were then vacuum formed into the two halves of a bottle.

As shown in FIGURES 5 and 5A, the upper half 100 and lower half 102 of the container were vacuum formed from foamed Composition B having an external unfoamed, impervious tough skin. The wall of the upper half of the container was composed of the 20 mil skin 104 and the 50 mil foam portion 106 while the wall of the lower half of the container similarly was composed of the 20 mil skin 108 and the 50 mil foam portion 110. The foam portions 106 and 110 each had a density of about 30 lbs./cu. ft. The two low density surfaces 112 and 114 were joined together by spinning the upper half 100 of the container at 2500 r.p.m. and lowering it to bring it into contact with the lower half of the container.

Strong sealing is difficult to achieve in this operation because of the high thermal insulation characteristics of the plastic at the point of juncture and the fragile character of the small amount of material which melts around the bubbles of the foam portions at the interface 116.

In order to improve the seal, it has been found desirable to spin the upper half (or lower half) of the container at a moderate rate, e.g., 750 r.p.m., so that the material can be slightly softened, temporarily press the two halves of the container together to densify the foam portions at and near the interface, separate the two surfaces 112 and 114 and then to spin at a higher speed, e.g., 2500 r.p.m. and bring the surfaces together again for the final weld.

FIGURES 6 and 6A illustrate another form of the invention which gives a better control of the line of juncture on large diameter objects.

Thus, the upper portion 120 and the lower portion 122 of a container having a diameter of 12 inches were vacuum formed from foamed Composition B having both internal and external unfoamed, impervious tough skins.

The wall of the upper portion of the container was composed of a 20 mil outer skin 124, the 80 mil foamed core 126 and a 20 mil inner skin 128, while the wall of the lower portion of the container similarly was composed of the 20 mil outer skin 130, the 80 mil foamed core 132 and a 20 mil inner skin 134. The foam portions 126 and 132 each had a density of 30 lbs./cu. ft. The two surfaces 136 and 138 which were to be joined together by spin welding were cut on the bias in order to obtain better control of the line of juncture. The upper portion 120 of the container was spun at 2000 r.p.m. and lowered into contact with the lower portion 122 to unite the two portions at interface 140.

FIGURES 7 and 7A show an alternative and more cumbersome spin welding technique wherein there is provided vacuum formed low density foam portions 142 and 144 having outer unfoamed, nonporous skins 146 and 148 and inner foamed sections 150 and 152. The skins were each 15 mils thick and the foamed portions 45 mils thick. There was also provided an unfoamed ring 154 made of Composition A. During the spin welding process this high density ring 154 was fused to both portions 142 and 144 to form the finished container.

FIGURES 8 and 8A illustrate the manner of heat sealing of a dense member to a light member to form a container by spin welding. The light member acts as insulation and most of the fusion occurs, therefore, in the dense portion. Accordingly, the contour of the light portion is desirably hollowed or grooved.

Thus, as shown in FIGURE 8, the vacuum formed upper portion 156 of the container has an unfoamed vertical wall 158 composed of Composition A. The wall at its lower end terminated in a convex portion 160. The lower portion 162 of the container was vacuum formed from foamed Composition B into a wall 161 having an external unfoamed, impervious tough skin 164, a foamed core 166 and an internal unfoamed, impervious tough skin 168. The core had a density of 25 lbs./cu. ft. and a thickness of 50 mils. Each of the skins 164 and 168 had a thickness of 10 mils. As in the other examples the unfoamed skins were integrally united to the foam portion.

The wall 161 at its upper end terminated in a concave portion 170 which mated with the convex portion 160 in the upper wall 158. The upper wall portion 158 was spun at 2500 r.p.m. and gradually lowered so that the ends 160 and 170 were in mating engagement and welding resulted along the line 172, as shown in FIGURE 8A.

Instead of employing an unfoamed portion and a foamed portion in carrying out the spin welding process as illustrated by FIGURES 8 and 8A, there can be employed two foam portions having different densities, e.g., using foamed polystyrene made from Composition B. The upper foam portion can have a density of 50 lbs./cu. ft. and the lower foam portion a density of 15 lbs./cu. ft.

While the upper and lower portions which are joined by spin welding are normally made up of the same resin, it is possible according to the invention to spin weld different skinned foam resins. Thus, the upper portion can be a foamed polyethylene having an external skin and the lower portion can be a foamed polypropylene having an external skin.

Figure 10:
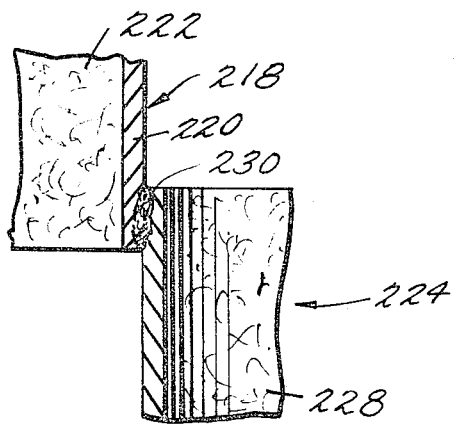
FIGURE 10 is a view partially broken away showing a weld similar to that in FIGURE 9 but employing two halves, each of which has a single skin.
Figure 11:
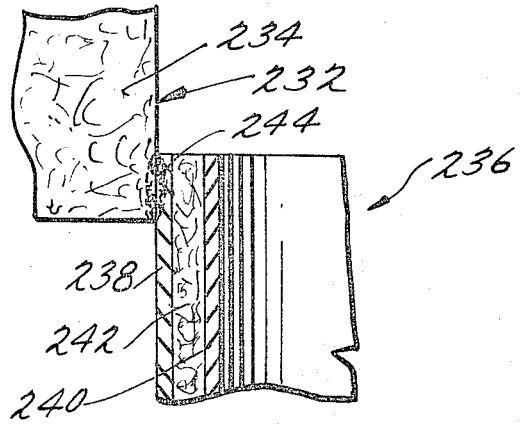
FIGURE 11 is a view similar to FIGURE 10 but employing one half with a single skin and the other half without a skin.

FIGURES 9 to 11 illustrate the presently preferred form of the invention. As shown in FIGURE 9, there were provided two generally cylindrical halves 200 and 202 of a container, e.g., a bottle. Top half 200 had a tubular wall composed of a nonporous, unfoamed, tough outer skin 204 of polystyrene, a foamed core 206 of the polystyrene and a nonporous, unfoamed, tough inner skin 208 of the polystyrene. Bottom half 202 similarly had a tubular wall composed of a nonporous, unfoamed, tough outer skin 210 of the polystyrene, a foamed core 212 of the polystyrene and a nonporous, unfoamed, tough inner skin 214 of the polystyrene. In each case the skins were integral with the foamed core. As can be seen from FIGURE 9, the outer surface of the upper half 200 in the area of joinder just fits into the inner surface of the lower half 202 so that the two halves are telescoped. As a result, during the spin welding the inner skin 214 of the lower half is directly against the outer skin 204 of the upper half to provide an overlapping fusion area 216 as a result of the spinning to form the final container. Using polystyrene spin welding of the two halves of the container of FIGURE 9 was accomplished satisfactorily using spinning speeds of 370 r.p.m. and 620 r.p.m. As indicated in FIGURE 9, the top half 200 was spun while the bottom half 202 was not. However, as previously indicated, bottom half 202 can be spun while top half 202 remains stationary to provide a strong overlapping weld area.

When employing rubber modified polypropylene to form the same container as in FIGURE 9, it has been found that the spinning speed desirably is somewhat higher, e.g., from 1100 to 1900 r.p.m.

It has also been found that instead of spinning top half 200 similar welding results can be accomplished by rapidly oscillating it while it is telescoped inside the lower half. Thus, with the skinned foamed polystyrene described in connection with FIGURE 9, oscillation welding was successful using about 100 cycles per second and a 0.1 inch stroke. In the oscillating welding technique there is also an area of overlap at the jointure similar to that shown in FIGURE 9.

FIGURE 10 illustrates the formation of a spin welded container formed in the same manner as that described in FIGURE 9. In FIGURE 10, however, the upper tubular wall portion 218 is composed of an external, nonporous, unfoamed, tough skin 220 integral with a foam portion 222. There is no internal skin. Similarly, the lower tubular wall portion 224 is composed of an internal, nonporous, unfoamed, tough skin 226 integral with the foam portion 228. The vertically extending fused overlapping area of joinder of the two wall portions resulting from the spin welding is shown at 230.

FIGURE 11 also illustrates the formation of a spin welded container formed in the same manner as that described in FIGURE 9. In FIGURE 11, however, the upper tubular wall portion 232 is composed of foam 234, e.g., foamed polystyrene, and has no skin. The lower tubular wall portion 236 is composed of an internal nonporous, unfoamed, tough skin 238, an external nonporous, unfoamed, tough skin 240 and a foamed core 242 integral with the skins. The lower wall portion can also be made of polystyrene. The vertically extending fused overlapping area of joinder of the two wall portions resulting from the spin welding is shown at 244. FIGURE 11 illustrates the condition when one of the wall portions does not contain a skin in the area of joinder.

The spin welded containers of the present invention can be used as containers for food, medicine, insecticides, herbicides, nematocides, cigarettes, cigars, chests, cupboards, camera cases, containers for delicate machinery, etc.

The containers, of course, can be decorated, e.g., by direct printing, silk screen printing, embossing, application of decals, grinding the surface to expose partially broken away bubbles. In the case of foamed products from polyethylene and polypropylene their skinned surfaces can be treated with an oxidizing agent, e.g., chromic acid or ozone, or with a corona discharge or a flame to make the decorations stick.

The spin welded containers usually are of generally cylindrical structure but they can be of rectangular or other polyhedric shape.

We claim:
1. A welded container having thermoplastic resin wall means, said wall means comprising a pair of fitting cooperating portions, at least one of said portions comprising a foamed thermoplastic resin having at least one nonporous, substantially unfoamed, tough skin of the same resin integral with said foamed portion, a fused weld por- tion of thermoplastic resin substantially devoid of foam and including said skin joining said pair of cooperating portions, one of said cooperating portions having an outer wall portion fitting within an inner wall portion of the other of said cooperating portions in the weld area to provide overlapping contact and joining in said weld area.

2. A container according to claim 1 which is spin welded.

3. A container according to claim 2 wherein the overlapping area is vertical.

4. A container according to claim 2 wherein both cooperating portions have said skin in the area of joinder.

5. A container according to claim 1 wherein only one of said cooperating portions has said skin in the area of joinder.

6. A method of forming a container comprising welding together two cooperating portions of a container by rapid relative movement between the two portions while they are in close proximity, each of said portions consisting of a foam thermoplastic resin portion and at least one of said portions including at least one nonporous, unfoamed, tough skin of said resin integral with the foam resin portion, said skin being present in the weld area.

7. A process according to claim 6 wherein the welding is spin welding.

8. A process according to claim 7 wherein only one of said cooperating portions has a skin.

9. A process according to claim 7 wherein both of said cooperating portions have a skin.

10. A method according to claim 7 wherein the spin welding is accomplished by rotating one-half of the container while in contact with a contiguous surface of the second half of the container, there being initially a high relative velocity between the two halves of the container so that a rapid generation of heat is created between the surfaces in contact and they are brought to a welding temperature.

11. A process according to claim 10 wherein the second half of the container is initially at zero velocity and is rotated at a gradually increasing velocity until it has the same velocity as the first half of the container.

12. A process according to claim 6 wherein one of said cooperating portions is telescoped within the other cooperating portion in the weld area to provide an overlapping area of joinder.

13. A process according to claim 12 wherein the welding is spin welding.

References Cited

UNITED STATES PATENTS

| | | | |
|---|---|---|---|
| 3,002,871 | 10/1961 | Tramm et al. | 156—73 |
| 3,275,179 | 9/1966 | Lux et al. | 220—4 |

JOSEPH R. LECLAIR, *Primary Examiner.*

D. T. NORTON, *Assistant Examiner.*